March 21, 1939.　　　　C. P. SWEENY　　　　2,151,058
MOTOR SYSTEM
Filed Dec. 17, 1936
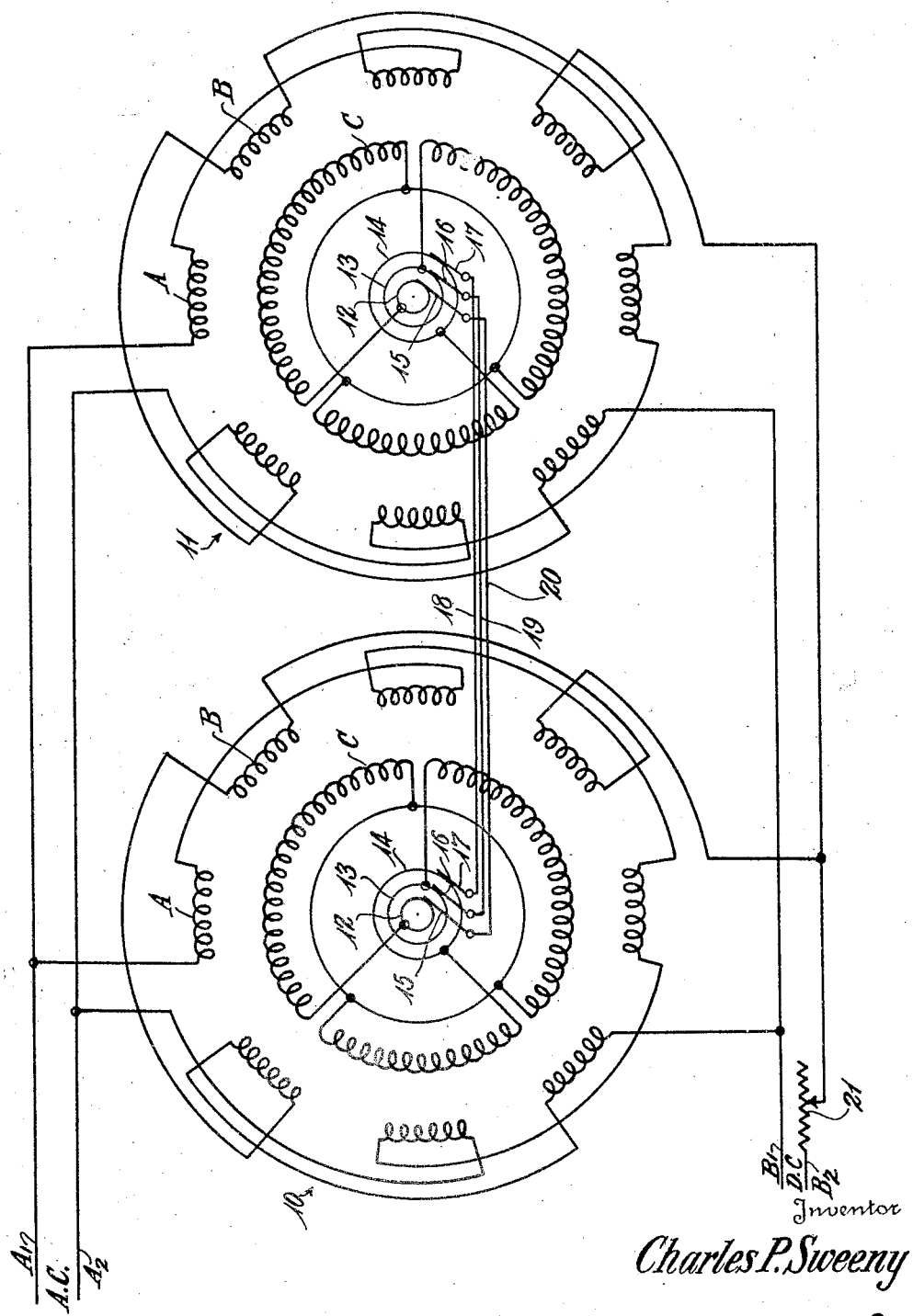
Inventor
Charles P. Sweeny
By Barnes, Kisselle, Laughlin & Raisch
Attorneys Patented Mar. 21, 1939

2,151,058

UNITED STATES PATENT OFFICE 2,151,058

MOTOR SYSTEM

Charles P. Sweeny, Detroit, Mich., assignor to Vickers, Incorporated, Detroit, Mich., a corporation of Michigan Application December 17, 1936, Serial No. 116,430

5 Claims. (Cl. 172—239)

This invention relates to electric motor systems, and more particularly to a motor system of the electric gear type in which rotation of the rotor of one motor causes the rotors of one or more motors at a distance from the first motor to follow the rotor of the first motor.

An object of the present invention is to provide an electric motor system in which the rotor of a distant motor accurately follows the rotor of a control motor.

Another object of the invention is to provide an electric motor system of the "Selsyn" type in which the controlled motor has high torque both during rotation of the rotor of the control motor and in pulling into step or phase with the control motor, and in which the value of this torque can be controlled.

A further object is to provide such a motor system in which the controlled motor will maintain exact step with the control motor under load.

A still further object of the invention is to apply direct current energization to the motors of an electric gear to increase the torque of the controlled motors and therefore the load under which they will maintain substantially exact corresponding positions with respect to the control motor.

Other objects and advantages of the invention will appear in the following description of a preferred embodiment of the invention shown in the attached drawing of which the single figure is a schematic drawing of a motor system including two motors.

Referring to the drawing, two similar motors 10 and 11 are provided with primary windings A energized from a source of alternating current through the conductors A₁, A₂; control windings B energized from a source of direct current through the conductors B₁, B₂; and secondary windings C connected together through slip rings 12, 13 and 14, brushes 15, 16 and 17 and conductors 18, 19 and 20.

The primary winding A of each motor is usually positioned on the stator member and is shown as a four-pole single phase winding although such winding may be positioned on either member of the motor and may have any number of poles desired. The secondary winding C is positioned upon the motor member which is relatively rotatable with respect to the primary winding and usually upon the rotor member as shown. Preferably this winding is a Y connected phase winding although other connections such as the Δ connection shown in my copending application, Serial No. 72,632, filed April 3, 1936, of which this application is a continuation in part, may be employed. The disclosure of the present application differs from Figure 20 of the above mentioned copending application only in that a Y connected secondary is employed instead of a Δ connected secondary and a rheostat 21 is provided to vary the direct current energization of the motor. The Y connection is in general preferable because undesirable circulating currents in the secondary sometimes occur with a Δ connection, which currents increase the power taken by the motor without producing any useful result.

The primary and secondary windings A and C of the two motors react upon each other in the normal manner of electric gear systems in which the displacement of the rotor of one motor with respect to that of the other causes resultant voltages to be induced in the two secondary windings. These resultant voltages cause power currents to circulate between these windings which tend to cause the rotors to move into step. In the present system, however, the primary windings are energized to produce less than the normal magnetizing flux of the motor when only the primary windings are energized and a supplemental direct current energization by the control winding B, which is preferably positioned upon the same member as the primary winding, is employed to bring the iron of the motor to normal saturation for the motor. That is, the voltage applied to the primary winding A is not sufficient to cause normal saturation of the iron of the motor, and applying the direct current energization to the control winding B brings the iron to normal saturation, thus decreasing the effective reactance of the primary winding and causing larger currents to flow therein.

The conductors of the control winding are preferably so positioned that no resultant voltages are induced therein by the alternating flux produced by the energization of the primary winding, so that no substantial alternating currents flow in these windings when the rotors are in corresponding positions. However, when the rotors of the two motors are displaced relative to each other, the fields caused by currents circulating between the two secondary windings C and through these windings cut the control winding and also distort the alternating current field from the primary winding to produce resultant voltages in the control winding which cause alternating currents to circulate between and through the control windings. These currents are also power currents and increase the torque of the controlled motor. It will be apparent that the latter effect does not depend primarily upon the direct current energization, since the provision of interconnected windings, such as the control windings B, would provide additional paths for the circulation of power currents between the two motors upon relative displacement of the rotors thereof even if the control windings are not energized by direct current. The direct current energization of the control windings B does however decrease the available torque of the controlled motor independently of circulating currents in the control windings since it causes larger currents to flow in the primary and secondary windings and the various interactions discussed above between the various windings are made possible by the employment of distributed windings in slots of the motor members and the absence of salient poles. The direct current energization provides a means for varying the available torque of the controlled motor. This variation can be accomplished by any desired means of varying the direct current voltage, for example, by the variable resistance shown. In most installations, however, the amount of direct current energization will be predetermined and the correct value of direct current voltage supplied with no means for adjusting this voltage.

While I have described the invention with respect to two motors, either one of which may be the control motor driving the other motor, any number of motors may be similarly interconnected so long as the control motor is of sufficient size to drive the other motors. Also it is understood that the details of the invention may be varied within the scope of the following claims.

I claim as my invention:

1. In a motor system of the electric gear type, a plurality of electric motors having rotor and stator members, a source of alternating current power, a primary distributed winding upon one member of each motor and energized from said source of power to produce a single phase alternating current field in each said motor, a phase wound secondary winding upon the other of said members of each motor, the secondary windings of said motors having the same number of phases and being connected together to provide for the flow of power currents between and through said secondary windings when the rotors of said motors are relatively displaced, and a tertiary distributed winding upon said one of said members of each motor, the tertiary windings of said motors being connected together, each tertiary winding having the connections thereto displaced with respect to the connections to the primary winding of the same motors and having its conductors positioned upon said motor to provide for the flow of substantial power currents between and through said tertiary windings when the rotors of said motors are relatively displaced.

2. In a motor system of the electric gear type, a plurality of electric motors having rotor and stator members, a source of alternating current power, a primary distributed winding upon one member of each motor and energized from said source of power to produce a single phase alternating current field in each said motor, a phase wound secondary winding upon the other of said members of each motor, the secondary windings of said motors having the same number of phases and being connected together to provide for the flow of power currents between and through said secondary windings when the rotors of said motors are relatively displaced, and a tertiary distributed winding upon said one of said members of each motor, the tertiary windings of said motors being connected together, each tertiary winding having the connections thereto displaced with respect to the connections to primary winding of the same motor and having its conductors positioned upon said motor to provide for the flow of substantial power currents between and through said tertiary windings when the rotors of said motors are relatively displaced, a source of direct current, said tertiary windings being connected to and energized from said source of direct current to establish a direct current field in said motors.

3. In a motor system of the electric gear type, a plurality of electric motors having rotor and stator members, a source of alternating current power, a primary distributed winding upon one member of each motor and energized from said source of power to produce a single phase alternating field in each said motor, the energization of said primary winding being insufficient to produce normal saturation of the iron of said motor adjacent said primary winding, a phase wound secondary winding upon the other of said members of each motor, a source of direct current power, a tertiary winding upon said one of said members of each motor, said third winding being distributed and being energized from said source of direct current power to produce a direct current field in said motor and increase the saturation of said iron adjacent said primary winding to normal saturation, the secondary windings of said motors having the same number of phases and being connected together to provide for the flow of power currents between and through said secondary windings when said primary and third windings are energized and the rotors of said motors are relatively displaced.

4. In a motor system of the electric gear type, a plurality of electric motors having rotor and stator members, a source of alternating current power, a primary distributed winding upon one member of each motor and energized from said source of power to produce an alternating current field in each said motor, a phase wound secondary winding upon the other of said members of each motor, the secondary windings of said motors having the same number of phases and being connected together to provide for the flow of power currents between and through said secondary windings when the rotors of said motors are relatively displaced, and a tertiary distributed winding upon said one of said members of each motor, the tertiary windings of said motors being connected together, each tertiary winding having the connections thereto displaced with respect to the connections to the primary winding of the same motors and having its conductors positioned upon said motor to provide for the flow of substantial power currents between and through said tertiary windings due to modification of said field of each motor by currents in said secondary windings when the rotors of said motors are relatively displaced.

5. In a motor system of the electric gear type, a plurality of electric motors having rotor and stator members, a source of alternating current power, a primary distributed winding upon one member of each motor and energized from said source of power to produce an alternating current field in each said motor, a phase wound secondary winding upon the other of said members of each motor, the secondary windings of said motors having the same number of phases and being connected together to provide for the flow of power currents between and through said secondary windings when the rotors of said motors are relatively displaced, and a tertiary distributed winding upon said one of said members of each motor, the tertiary windings of said motors being connected together, each tertiary winding having the connections thereto displaced with respect to the connections to primary winding of the same motor and having its conductors positioned upon said motor to provide for the flow of substantial power currents between and through said tertiary windings due to modification of said field of each motor by currents in said secondary windings when the rotors of said motors are relatively displaced, a source of direct current, said tertiary windings being connected to and energized from said source of direct current to establish a direct current field in said motors.

CHARLES P. SWEENY.